US007911171B2

(12) United States Patent
Miettinen

(10) Patent No.: US 7,911,171 B2

(45) Date of Patent: Mar. 22, 2011

(54) DEVICE FOR GENERATING ANALOG CURRENT OR VOLTAGE SIGNAL

(75) Inventor: Erkki Miettinen, Kokemäki (FI)

(73) Assignee: Abb Oy, Helsinki (FI)

( * ) Notice: Subject to any disclaimer, the term of this patent is extended or adjusted under 35 U.S.C. 154(b) by 559 days.

(21) Appl. No.: 12/017,711

(22) Filed: Jan. 22, 2008

(65) Prior Publication Data

US 2008/0174259 A1 Jul. 24, 2008

(30) Foreign Application Priority Data

Jan. 22, 2007 (FI) ...................................... 20075041

(51) Int. Cl.
*G05B 19/29* (2006.01)

(52) U.S. Cl. ......................... 318/600; 318/601; 318/691

(58) Field of Classification Search .................. 318/601, 318/600, 691; 388/801, 806, 809, 811
See application file for complete search history.

(56) References Cited

U.S. PATENT DOCUMENTS 5,170,496 A * 12/1992 Viereck ......................... 455/121
7,151,914 B2 * 12/2006 Brewer ...................... 455/127.1
2003/0040291 A1 * 2/2003 Brewer ......................... 455/127
2004/0239547 A1 12/2004 Boehm
2005/0146453 A1 * 7/2005 Jensen .......................... 341/131
2007/0075885 A1 * 4/2007 Somayajula .................. 341/143

OTHER PUBLICATIONS

Finnish Search Report (with English translation of category of cited documents) dated Nov. 22, 2007.

* cited by examiner

*Primary Examiner* — Bentsu Ro
*Assistant Examiner* — Thai Dinh
(74) *Attorney, Agent, or Firm* — Buchanan Ingersoll & Rooney PC

(57) ABSTRACT

In a device, such as measuring or control signal transmitter, generating an analog current or voltage output signal, absolute values of output variables are continuously measured and regulated to ensure the correctness of the signal. The actual current or voltage value of an analog output signal is measured and digitized (206), a difference (e) between the digitized actual current or voltage value and the desired current or voltage value is defined (300), and the generation (200, 202, 204, 205) of the analog output signal is controlled (304) by means of a digital control signal (Enable, Direction) so as to decrease the difference.

20 Claims, 1 Drawing Sheet

DEVICE FOR GENERATING ANALOG CURRENT OR VOLTAGE SIGNAL

BACKGROUND OF THE INVENTION

The invention relates to electronic devices for generating a current and voltage signal.

In industrial instrumentation, electric drives, such as motor drives and frequency converters, and other drives, analog outputs are often needed to signal various matters related to the operation of the drive. These include control and regulating signals or measuring signals. A 4 to 20-mA current loop is one analog electric communication standard that is generally used in this type of analog signaling. In a 4 to 20-mA current loop a 4-mA loop current typically represents a 0% signal value and 20 mA represents a 100% signal value. Correspondingly, a voltage signal, such as a 0 to 10-VDC voltage signal, can be used in analog signaling. In instrumentation, a device generating and transmitting an analog signal is generally called as a transmitter. Current loops in particular are often used to control separate analog panel gauges due to their easy readability.

Conventionally used current loops have several drawbacks that in certain cases may even lead to dangerous situations. A traditional simple current loop transmitter is often implemented by a pulse width modulation (PWM) principle, in which a signal coming from a controlling microprocessor, for example, switches a reference voltage on and off at a suitable pulse ratio and the resulting rectangular wave is filtered into a voltage command to a separate analog current generator. If high accuracy or resolution is required of the current loop, a current generator command formed by the PWM technique is usually not sufficient and a D/A converter with the required accuracy and resolution can be used. In both cases, current calibration and stability are completely dependent on fixed components, whereby the temperature dependency of the components may cause unexpected errors. Thus, there is no certainty as to the actual amount of the current passing through the current loop and whether the current loop has possibly been broken, in which case the analog gauge it controls will misleadingly indicate a zero value, even though the connection may in reality be dangerous because it is live. If the scales of panel gauges have been made for bi-directional display variables, it is preferable that the zero point of the gauge is in the middle of the scale even when the loop feeding the gauge is dead. This requires a bipolar current loop, in other words, it must be possible to change the direction of the current in the loop in accordance with the indication requirement of the gauge. Conventional current transmitters are not able to do this. If high accuracy or resolution is required of the current loop, a current generator command formed by a PWM technique is usually not sufficient and a D/A converter with the required accuracy and resolution needs to be used. The temperature dependency of the actual current generator part may still bring about unexpected errors that cannot be detected at all. In addition, accurate or high-resolution D/A converters are expensive which increases the costs of the signal transmitter.

BRIEF DESCRIPTION OF THE INVENTION

It is an object of the invention to provide a device with which it is possible to generate an accurate analog output signal in a relatively simple and inexpensive manner. The object of the invention is achieved with a method and system characterized by what is stated in the independent claims. Preferred embodiments of the invention are disclosed in the dependent claims.

According to the invention, absolute values of output variables are measured and regulated continuously to ensure the correctness of the signal. According to an embodiment, the actual current or voltage value of an analog output signal is measured and digitized, the difference between said digitized actual current or voltage value and a desired current or voltage value is determined, and the generation of the analog output signal is controlled with a digital control signal in such a manner that said difference decreases. With the solution of the invention, the absolute accuracy and stability of the analog output signal only depend on the accuracy of the measurement and digitizing. All errors of the circuit branch generating the analog signal are compensated through a feedback loop, because if the output signal does not correspond to the command value, the generation of the analog output signal is immediately controlled with a digital control signal to decrease said difference. With the invention, conversion from digital control to an analog output signal can be achieved using an inexpensive solution, because the accuracy of the conversion need not be set as strict requirements as before. Even though the invention requires measuring and digitizing the output signal, the device is still as a whole inexpensive, because an accurate A/D converter is considerably less expensive than an accurate D/A converter whose accuracy and stability is further reduced by the separate buffering required in the output. According to an embodiment of the invention, the digitizing of the measurement is performed with a sigma-delta ($\Sigma/\Delta$) modulator. A sigma-delta modulator is, due to its mode of operation, particularly resistant to different interference peaks, and its absolute accuracy and stability are excellent. In an embodiment of the invention, a digitized 1-bit signal generated by a sigma-delta modulator is digitally filtered and decimated to obtain a multibit, digitized, actual current or voltage value.

In various embodiments of the invention, there is preferably galvanic separation between the analog output and digital control. This reduces interference and errors that propagate to points critical to the accuracy of the device. Galvanic separation also provides a safety feature in case a signal in network potential, for instance, was connected by accident the analog output connectors. In an embodiment of the invention, digitizing is performed using an analog-to-digital conversion circuit, such as a sigma-delta modulator with integrated galvanic separation between the input and output. Correspondingly, a digital-to-analog conversion circuit with integrated galvanic separation between the input and output may be used in digital-to-analog conversion. Alternatively, it is possible to use separate galvanically separating circuits. In an embodiment of the invention, galvanic separation is implemented with an integrated DC-to-DC converter. It is further possible to use in the circuit branch (D/A) generating the voltage and the digitizing measuring branch (A/D) galvanic separation methods that differ from each other. In various embodiments of the invention, the power source of the analog parts of the device may be galvanically separated from other operating voltages of the surrounding equipment, such as an electric motor drive.

According to an embodiment of the invention, the analog output voltage is generated at an analog integrator stage and buffer stage as well as at a pre-stage that supplies direct voltage to the integrator stage according to a digital control signal, whereby the integrator is arranged to integrate the direct voltage and supply the integrated voltage through the buffer stage to the output of the device to form the analog output signal. According to an embodiment of the invention, a pre-stage comprises an analog switch that is arranged to be controlled through galvanic separation with a digital control signal to connect at least one direct voltage to the integrator stage. In an embodiment of the invention, a direction control signal is also connected to the analog switch through galvanic separation, the direction control signal having a first mode and a second mode, and the analog switch is arranged to connect to the integrator stage a first direct voltage according to a digital control signal, when the direction control signal is in the first mode, and to connect to the integrator stage a second direct voltage with an opposite polarity according to a digital signal, when the direction control signal is in the second mode. The digital control signal is preferably a control pulse. In an embodiment of the invention, the galvanic separation of the digital control signal is implemented with an integrated DC-to-DC converter.

The device of the invention is intended primarily for use in measuring and control signal transmitters. A particular field of application is electric motor drives. In an electric motor drive comprising a device of the invention, a circuit branch generating an analog output and a digitizing measuring branch are provided on a separate circuit board that is mounted in a circuit board connector on a main circuit board of the motor drive, and the control means that receive a digitized measuring signal and generate a digital control signal are provided on the main circuit board. With these solutions, it is possible to reduce the structural problems associated with traditional measuring and control signal transmitters.

BRIEF DESCRIPTION OF FIGURES

The invention will now be described in greater detail by means of exemplary embodiments and with reference to the attached drawing, in which.

DETAILED DESCRIPTION OF EXEMPLARY EMBODIMENTS OF THE INVENTION

Figure 1:
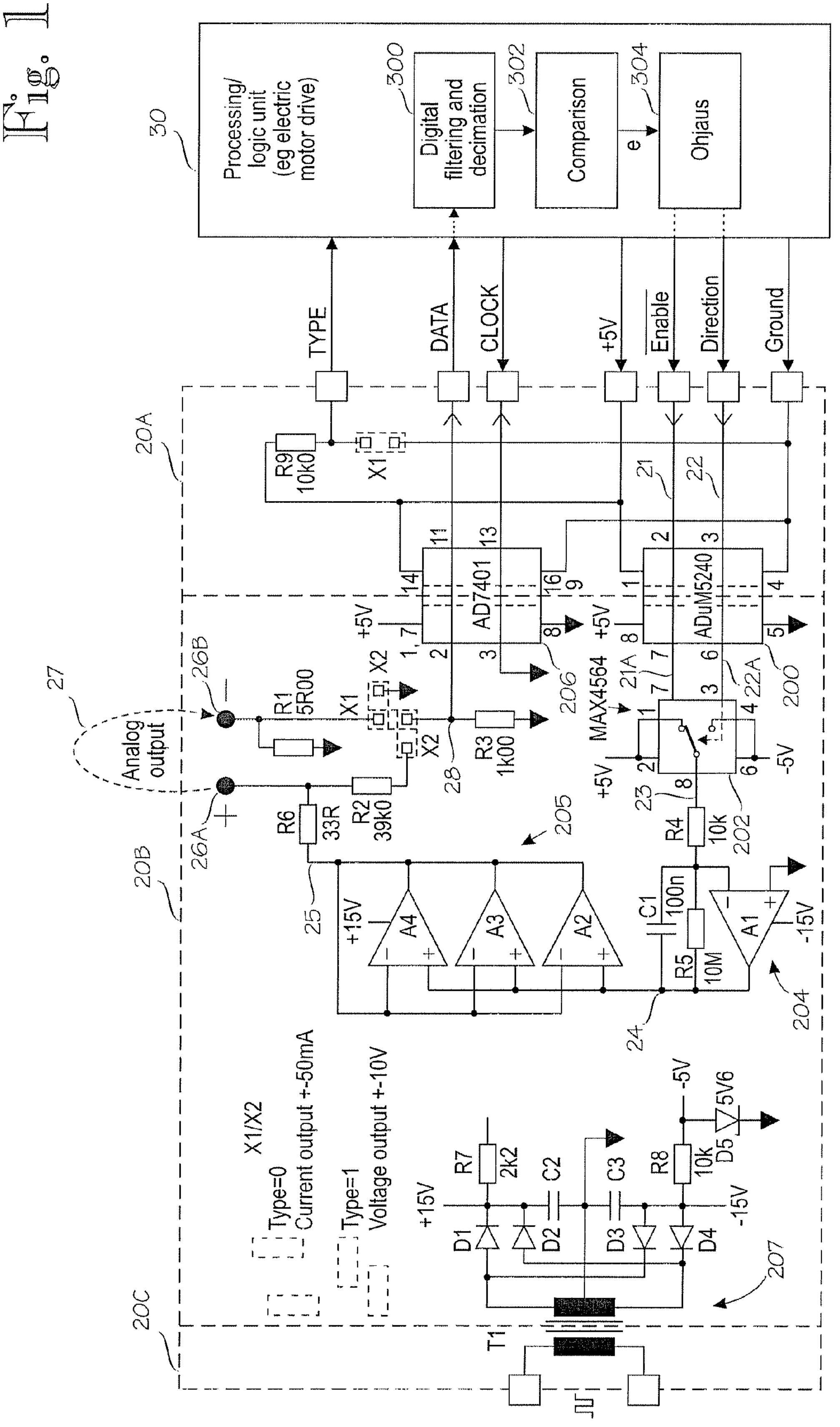
FIG. 1 shows a circuit diagram of a model circuit that applies the principles of the present invention.

In the example shown in FIG. 1, the invention is implemented with two separate modules (e.g. circuit boards) 20 and 30, but it may also be implemented as one or more modules.

Control module 20 generates an analog current or voltage output in accordance with digital information Enable supplied by module 30, and generates to module 30 a digitized signal DATA that represents the actual current or voltage value measured from the analog output. In the example, output TYPE from module 20 indicates to module 30 whether the analog output is a current signal (e.g. 4 to 20 mA) or voltage output (e.g. 0 to 10 V). In the example, module 20 generating the analog outputs can be configured to be used as either a current or voltage output by transposing only two bridge or jumper links X1 and X2, but module 20 may also be implemented as a current or voltage output only. The specified ±50-mA current output range of module 20 is selected to suit all most conventional current loop types and the control of analog gauges generally available. The voltage supply ability of the specified current range is ±10 V. The maximum current output is ±64 mA having a voltage supply capability of ±7.5 V. In the voltage output configuration, the specified output voltage range is ±10 V and current supply capability ±50 mA. The maximum voltage output is ±12.8 V having a current supply capability of ±24 mA.

The actual value of the current or voltage output is measured and it is set to the desired level by means of the digital feedback and kept there by continuous measuring. In the exemplary circuit, the resolution of the measurement is ±15 bits, which at maximum output means 64 mA/$2^{15}$=1.95 μA and 12.8 V/$2^{15}$=0.39 mV. These values are typically one order better than it is possible to achieve with the state of the art solutions.

The analog output circuit of the exemplary embodiment is implemented with components selected so as to minimize total costs, but to obtain the best possible accuracy and stability of output signals. The galvanic separation components used may also have other integrated functions in addition to the separation.

Control signals Enable and Direction from module 30 are connected to a two-channel digital separator 200 that separates digital I/O part 20A of module 20 from analog part 20B of module 20. In the exemplary embodiment, digital separator 200 is implemented with an integrated circuit containing an integrated DC/DC converter, such as ADuM5240 manufactured by Analog Devices Inc. An integrated DC/DC converter may also supply and stabilize the part of the +5-volt auxiliary voltage that cannot be obtained through resistance R7 from an auxiliary voltage source 207.

The galvanically separated control signals Enable and Direction are applied from separator 200 to the integrator stage formed by an analog switch 202 and integrator 204. In the example, analog switch 202 is an integrated switch circuit, such as MAX4564. Analog switch 202 is a change-over switch with one terminal (1) connected to a positive operating voltage +5 V and the other terminal (4) connected to an operating voltage −5 V having an opposite polarity. The common terminal (8) of analog switch 202 generates an output that is connected as input to integrator 204. Enable output 21A from separation circuit 200 is connected to Enable input (7) of analog switch 202. When Enable signal 21A is in logical state “1”, output 23 of analog switch 202 is in high-impedance mode, i.e. no signal is supplied to integrator 204. Direction control signal 22A from separation circuit 200 is connected to control input (3) of the connection direction of analog switch 202. When the logical state of Direction control signal 22A is “0” and the state of Enable signal 21A is “0”, a voltage of +5 V is connected to the output of analog switch 202. If the state of Direction control signal 22A is “1” and state of Enable signal 21A is “0”, a voltage of −5 V is connected to output 23 of analog switch 22.

An operational amplifier A1, resistors R4 and R5, and a capacitor C1 form the integrator 204. Depending on the voltage (+5 V, −5 V) of output 23 of analog switch 202, the current passing through resistor R4 either charges or discharges the capacitor and thereby increases or decreases the voltage level in output 24 of integrator 204. If output 23 of analog switch 202 is in high-impedance mode (Enable state of the control signal is “1”), no current passes through resistor R4 to change the charge of capacitor C1 and the voltage level of output 24.

Output 24 from integrator 204 is supplied to the input of buffer stage 205, and the output from buffer stage 205 is connected through resistor R6 to a positive (+) terminal 26A of the analog signal output of module 20. In the example of FIG. 1, buffer stage 205 is formed with three operational amplifiers A2, A3, and A4, but it may also be implemented with a smaller or greater number of operational amplifiers. Operational amplifiers of the integrated amplifier circuit TL074, for instance, can be use as operational amplifiers A1 to A4.

It should be noted that analog switch 202, integrator 204, and buffer stage 205 may be implemented in many different ways, for instance as transistor stages including discrete transistor components, combinations of integrated circuits and discrete transistor stages, or as one integrated circuit, as is apparent to persons skilled in the art on the basis of the present examples. It should also be understood that the generation of an analog output from a digital input provided by separation circuit 200, analog switch 202, integrator 204, and buffer 205 may also be implemented with other circuit solutions without differing from the basic principle of the present invention.

As stated earlier, the exemplary circuit of FIG. 1 may provide an analog current output or analog voltage output depending on how bridge links X1 and X2 are connected in module 20. When an analog current output is desired, vertical bridge links X1 and X2 are connected in the manner shown in FIG. 1. Negative (–) terminal 26B of the analog output is then connected to a common potential (e.g. zero potential) through both resistor R1 and resistor R3. If the signal voltage in (+) terminal 26A is zero, no current passes through current loop 27 and resistor R1. When the voltage of (+) terminal 26A increases, the voltage of (–) terminal 26B depends on the current passing through resistor R1, which is at the same time the current of current loop 27. The value of resistor R3 is very high in relation to that of resistor R1, and the effect of the current flowing through resistor R3 need not be taken into account as voltage loss. Second bridge link X1 in part 20A of module 20 connects signal TYPE to ground, which makes the state of signal TYPE "0". This indicates to module 30 that module 20 is configured to act as a current output.

When module 20 is needed to provide a voltage output, horizontal bridge links X2 are connected as shown in FIG. 1. Bridges X1 are not connected. Output signal TYPE from module part 20A is then connected through resistor R9 to a +5-V operating voltage, whereby the state of signal TYPE is "1". This indicates to module 30 that module 20 is configured to act as a voltage output. Now (+) terminal 26A of the analog output is connected through resistors R2 and R3, and (–) terminal 26B is directly connected to ground (zero potential).

When module 20 is in voltage output mode, the voltage of connection node 28 of resistors R2 and R3 is proportional to the output voltage between terminals 26A and 26B. In current output mode, node 28 is directly connected to (–) terminal 26B, whereby the voltage of node 28 is the same as that of resistor R1 and thus proportional to the current of current loop 27. In the exemplary embodiment of FIG. 1, the voltage of node 28 is monitored by a voltage measuring and digitizing unit 206. Unit 206 may be implemented with any arrangement that measures the analog voltage in node 28 and digitizes the measuring result for supplying as digital data DATA into module 30. A Σ/Δ modulator with excellent absolute accuracy and stability but inexpensive price is preferably used in the digitizing. The Σ/Δ modulator is also, due to its mode of operation, particularly resistant to various interference peaks. In an embodiment shown in FIG. 1, measuring and digitizing unit 206 is implemented with an integrated Σ/Δ modulator circuit AD7401 manufactured by Analog Devices. AD7401 is a second-order Σ/Δ modulator that converts an analog input signal into a high-speed, 1-bit data flow and also comprises digital separation implemented inside an integrated circuit chip. This separation is illustrated by a dashed line inside unit 206 in FIG. 1. Owing to this, measuring and digitizing unit 206 also acts as a galvanically separating interface between analog part 20B and digital part 20A of module 20. Alternatively, if measuring and digitizing unit 206 is an AD converter, for instance, with no internal galvanic separation, the galvanic separation can be implemented with a separate separation circuit, such as ADuM5240 used as separation circuit 200. The analog modulator of the integrated circuit AD7401 continuously samples the analog input, in other words node 28, and no external sample and hold circuitry is needed. However, some AD converter circuits may require an external sample and hold circuit or some other corresponding measuring circuit. The 1-bit data flow DATA generated by measuring and digitizing unit 206 is applied to control module 30, where digital filtering and decimation may be performed to it to obtain multibit measuring information. A $Sinc^3$ filter, for instance, is preferred, because it is one order higher than the second-order modulator AD7401. If a decimation ratio of 256 is also used, a 16-bit word is obtained at a rate of 62.5 kHz, when external clock signal CLOCK supplied to unit 206 is 16 MHz. When 1 bit is used for the sign, an accuracy of ±15 bits is obtained. Digital filtering and modulation 300 may be implemented with an integrated circuit or signal processor. In the example of FIG. 1, digital filtering and decimation are on a different processing/logic unit 30, such as in the electric motor drive, because this provides several advantages. The module generating the analog output signal can be implemented in a smaller size. Fewer signal lines are required between module 20 and the processing/logic unit, because the measuring data is transferred as a 1-bit signal. Digital filtering and decimation 300 can, if desired, be implemented by a program in the processor of processing/logic unit 30.

The exemplary embodiment of FIG. 1 also comprises an auxiliary power source 207 with a transformer T1, diodes D1 to D4, capacitors C2 and C3, resistors T7 and R8, and zener diode D5. To the primary side of transformer T1, an alternating voltage, such as rectangular wave voltage, is supplied, which is usually easily available from processing/logic unit 30, for instance. The primary and secondary sides of transformer T1 are naturally galvanically separated and as a result of this, analog part 20B of module 20 is also galvanically separated from primary side 20C of power supply and the voltage source supplying it. Thus, the ground potential of analog part 20B of module 20 and all operating voltage potentials are fully floating in relation to the surrounding devices.

The following describes the operation of FIG. 1 in current output mode; in other words, when bridge links X1 are in vertical positions according to FIG. 1. Let us assume that initially no rectangular wave is supplied to the primary side of transformer T1 and auxiliary voltage source 207 does not supply auxiliary voltages ±5 V. Analog part 20B of module 20 is then switched off. When a rectangular wave is supplied to the primary winding of auxiliary voltage source 207, auxiliary voltages ±5 V are supplied to analog part 20B of module 20. At a moment when operating voltages are connected to analog part 20B, capacitor C1 of integrator 204 has no charge and the output voltage of integrator 204 at node 24 is 0. Control signal Enable 21/21A supplied by module 30 is at state "1", so output 23 of analog switch 202 is in high-impedance mode and no charge current passes through resistor R4 to capacitor C1. Because of this, the voltage of node 24 remains at 0, when operating voltages are connected to analog part 20B of module 20. Buffer stage 205 forwards the zero voltage of integrator output 24 to output (+) terminal 26A. Because output (–) terminal 26B is connected through resistor R1 to zero potential, output terminals 26A and 26B are at the same potential and no current can pass through current loop 27. Output (–) terminal 26B is through bridge link X1 also connected to node 28 whose voltage is measured with Σ/Δ modulator 206. As earlier stated, the voltage of node 28 depends on the current flowing through resistor R1, which corresponds to the current of loop 27. Σ/Δ modulator 206 measures the zero voltage in node 28 and generates corresponding 1-bit information DATA to module 30. In module 30, the 1-bit data is digitally filtered and decimated 300 and ±15-bit binary information is generated that exactly indicates the voltage of node 28 and thereby the loop current. State "0" of signal TYPE indicates to module 30 that module 20 is in current output mode and the measured voltage represents a loop current. The processing/logic unit of module 30 compares the measured loop current value with the desired loop current value, i.e. command value, and generates difference information that is in some way proportional to the deviation of the measured current from the command value, as illustrated in block 302. Regulating block 304 of the processing/logic unit determines on the basis of the measured value and reference value, such as difference information e, the direction into which the loop current should be changed and sets the Direction signal controlling analog switch 202 in the correct state. Let us assume that the Direction signal is set at "1" that controls analog switch 202 to +5 V. Regulating unit 304 then generates to control line Enable a "0"-level control pulse whose length is defined on the basis of difference information e. For the duration of the "0" pulse of the Enable signal, the output of analog switch 202 changes from high-impedance mode to voltage +5 V, in which case a current passes through resistor R4 to charge capacitor C1 and increase the voltage at output node 24 of integrator 204. In the model case, the output voltage of the integrator changes approximately at a rate of (5 V/10 kΩ)/100 nF=5 V/ms. As a result of this, a loop current begins to flow through current loop 27 and resistor R1, whereby the voltage of node 28 increases and Σ/Δ modulator 206 and digital filtering and decimation 300 generate a measuring value corresponding to the increased loop current value to comparison block 302. On the basis of this, new difference information e is formed and it is used by regulating block 304 to define a new Enable pulse length and integration direction. If the output voltage of integrator 204 needs to be decreased, the Direction signal is set to "0", in which case the output of analog switch 202 is connected to voltage −5 V and the current from capacitor C1 to resistor R4 flows in the opposite direction and discharges the capacitor C1. This way, loop current 27 is continuously regulated by means of measurement and feedback to keep it in its command value.

Let us now examine the accuracy and performance of the embodiment shown in FIG. 1. It should be noted that the absolute accuracy and stability of the output signal depend only on the Σ/Δ modulator performing the digitizing and resistors R1, R2, and R3. For example, when the nominal input voltage range of the Σ/Δ modulator is ±200 mV and its linear overrange is up to ±320 mV, the resistance R1=5Ω used in the exemplary circuit produces a total measuring range of ±64 mA, including the overrange, so it includes all currently used current loop types. The resolution of the Σ/Δ modulator is 1/±15 bits, for instance, which in this example means a resolution of 64 mA/$2^{15}$=1.95 μA. This resolution is sufficient for most applications. Let us assume that the resistance of current loop 27 is 0Ω and analog switch 202 is controlled with a 100-ns Enable pulse. The output voltage of integrator 204 and at the same time buffer stage 205 changes by 5 V/ms*100 ns=0.5 mV. This voltage change affects the serial connection (38Ω) of resistors R6 and R1, so the current of current loop 27 changes by 0.5 mV/38Ω=13.2 μA. If the minimum length of the Enable pulse can, in practice, be 15 ns, the smallest step of the output voltage change of integrator 204 becomes 1.97 μA, which is approximately the same as the resolution of the current measurement. Let us further examine a situation in which the resistance of current loop 27 is the highest possible standard value, i.e. 10 V/50 mA=200Ω. The above-mentioned 100-ns Enable pulse then causes a current change of only 0.5 mV/238Ω=2.1 μA, so the resistance of current loop 27 affects the change rate of the current. With the highest current loop 27 resistance and continuous control, the change rate of the current is at most (5 V/ms)/238Ω=21 mA/ms, but if the current loop 27 resistance is 0, the change rate is 132 mA/ms.

Let us next examine the operation of the device of FIG. 1 in voltage output mode, in other words, when bridges X2 are in the horizontal positions in FIG. 1. The output (+) terminal 26A is then connected through the serial connection of resistors R2 and R3 to a common potential (zero potential). Correspondingly, (−) terminal 26B is directly connected to the common potential (zero potential). Signal line TYPE is connected through resistor R9 to a voltage of +5 V, whereby state "1" of signal TYPE indicates to module 30 that module 20 is in voltage output mode. Let us assume, as in current output mode, that auxiliary voltages ±5 V are connected to analog part 20B of module 20, when the Enable signal is in state "1". In such a case, when analog module part 20B is switched on, output 23 of analog switch 202 is in high-impedance mode, the output voltage of integrator 204 is 0 and, correspondingly, the voltage of output (+) terminal 26A is 0. The voltage of terminal 26A is measured at node 28 of a voltage divider formed by resistors R2 and R3 with Σ/Δ modulator 206. The 1-bit signal DATA generated by Σ/Δ modulator 206 is digitally filtered and decimated in block 300 of module 30 so that ±15-bit binary information is produced to indicate exactly the output voltage of terminal 26A. On the basis of the signal TYPE "1", module 30 knows that module 20 is in voltage output mode. Block 302 generates difference information e that is proportional to the deviation of the measured value of the output voltage from its desired value, i.e. command value. On the basis of the difference information, regulating block 304 defines the direction into which the output voltage of integrator 204 should be changed, and the length of the 0-level Enable pulse. Let us assume that the output voltage is to be increased in the positive direction. Regulating unit 304 then sets the Direction signal to "1" and supplies a 0-level Enable pulse that has a length defined on the basis of difference information e. Analog switch 202 then connects a voltage of +5 V to the output for the duration of the Enable pulse. The current flowing through resistor R4 charges capacitor C1 and increases the output voltage of integrator 204 and the voltage of output terminal 26A. The voltage of node 28 increases in proportion to a digital measuring value corresponding to the increased voltage and supplied by of the Σ/Δ modulator and digital filtering and decimation block 300. On the basis of the new measuring value of the output voltage and the command value, new difference information is generated and regulating block 304 controls with the Enable and Direction signals integrator 204 to change its output voltage into a direction in which difference e decreases. By continuous regulation of this type, the analog output voltage can be made to settle at its command value and remain there.

Let us next examine the accuracy and performance of the device of FIG. 1 in voltage output mode. Let us assume that the nominal input voltage range of Σ/Δ modulator 206 is ±200 mV and the linear overrange extends up to ±320 mV, in which case the voltage division R2-R3 according to FIG. 1 produces a total measuring range of ±12.8 V including the overrange. This measuring range includes most of the presently used command value sequences. The resolution of the Σ/Δ modulator is 1/±15 bits, which means a voltage resolution of 12.8 V/$2^{15}$=0.39 mV. This resolution is sufficient for most applications. The output voltage of integrator 204 changes at a rate of approximately (5 V/10 kΩ)/100 nF=5 V/ms. By way of example, let us assume that the resistance of the load connected to output terminal 26A-26B is the smallest allowed, i.e. 10 V/50 mA=200Ω, and integrator 204 is controlled with a 100-ns Enable pulse. The output voltage of integrator 204 and at the same time that of buffer stage 205 changes by 5 V/ms*100 ns=0.5 mV. This voltage change is seen in the output due to the effect of the voltage decrease caused by the resistance of resistor R6 200Ω/233Ω*0.5 mV=0.43 mV. If the minimum length of the Enable pulse is in practice 15 ns, the smallest step of the output voltage change becomes 0.064 mV, which is very much smaller than the resolution of the voltage measurement. With the smallest allowed output load resistance and continuous control, the change rate of the output voltage is at most 5 V/ms*(200Ω/233Ω)=4.29 V/ms.

The present invention is not intended to be limited to the above components, component values or circuit configurations, and it is clear that, by changing the component values, components, and circuit configurations, the characteristics of the device can be changed without differing from the basic principles of the present invention.

In an embodiment of the invention, module 20 of FIG. 1 is implemented with a small-size circuit board module that may contain a desired number of analog signal outputs. The circuit board of module 20 is furnished with a suitable connector with which the circuit board of module 20 can be connected to a corresponding connector in a mother board. The mother board preferably also contains the functions of module 30. The mother board may be a circuit board containing a frequency converter. This structure provides several advantages over traditional solutions in which analog signal outputs are typically parts of a frequency converter board, for instance, which is often close to the power stage of the frequency converter or even built as part of it. This has produced several drawbacks. Due to its complexity, a frequency converter board, just like a motor control board, has generally at least six layers, and placing simple I/O functions on the mother board means wasting expensive surface area. If the analog output was made directly on the mother board during installation, the bending caused by the mechanical forces used in the installation could mean that the numerous and in part large surface mounting components on the mother board might damage, which is only revealed at start-up. Maintenance is expensive and may cause delays. All I/O cables must be reserved a natural route, which is often very difficult due to the cramped location of the frequency converter board or motor control board and leads to solutions in which maintenance work is substantially difficult and the obtained level of electromagnetic compatibility (EMC) is not sufficient, either. In addition, it is often preferable for cabling, connection and maintenance to locate I/O interfaces of several drive groups in one place, completely separate from motor control, but this cannot be done, because I/O functions are mounted directly on the mother board. With a module board 20 of the preferred embodiment of the invention, mounted with a connector on the mother board, it is possible to avoid the above-mentioned prior-art problems and achieve the above-mentioned desired advantages.

It is apparent to a person skilled in the art that as technology advances, the basic idea of the invention can be implemented in many different ways. The invention and its embodiments are thus not limited to the examples described above, but may vary within the scope of the claims.

The invention claimed is:

1. An electric motor drive, comprising:

at least one measuring or control signal transmitter; and an electric motor drive control processor or logic, wherein the signal transmitter includes:

output terminals connectable to a wired current loop, a signal generator configured to generate an analog current or voltage output signal at said output terminals and thereby to said wired current loop in response to a digital control signal, and means for measuring and digitizing an actual current or voltage value of an analog output signal at said output terminals, and wherein the electric motor drive control processor or logic is configured to receive said digitized actual current or voltage value, determine a difference between said digitized actual current or voltage value and the desired current or voltage value of the analog output signal at said output terminals, and control the signal generator by using a digital control signal in such a manner that the difference decreases.

2. The electric motor drive as claimed in claim 1, wherein the electric motor drive comprises galvanic separation between the analog output and the electric motor drive control processor or logic.

3. The electric motor drive as claimed in claim 2, wherein said measuring and digitizing means comprise an analog-to-digital converter.

4. The electric motor drive as claimed in claim 2, wherein said measuring and digitizing means comprise an integrated analog-to-digital converter circuit with an integrated galvanic separation between the input and output.

5. The electric motor drive as claimed in claim 2, wherein said measuring and digitizing means comprise a sigma-delta modulator.

6. The electric motor drive as claimed in claim 1, wherein said measuring and digitizing means comprise an analog-to-digital converter.

7. The electric motor drive as claimed in claim 6, wherein said measuring and digitizing means comprise an integrated analog-to-digital converter circuit with an integrated galvanic separation between the input and output.

8. The electric motor drive as claimed in claim 1, wherein said measuring and digitizing means comprise an integrated analog-to-digital converter circuit with an integrated galvanic separation between the input and output.

9. The electric motor drive as claimed in claim 1, wherein said measuring and digitizing means comprise a sigma-delta modulator.

10. The electric motor drive as claimed in claim 9, further comprising digital means for filtering and decimating a digitized 1-bit signal generated by the sigma-delta modulator so as to obtain a multibit, digitized, actual current or voltage value for said electric motor drive control processor or logic.

11. The electric motor drive as claimed in claim 1, wherein signal generators comprise an analog integrator stage and buffer stage and fifth means for supplying dc voltage to the integrator stage in accordance with said digital control signal, whereby the integrator is arranged to integrate said dc voltage and supply the integrated voltage through the buffer stage to the output of the signal transmitter to form said analog output signal.

12. The electric motor drive as claimed in claim 11, wherein said fifth means comprise an analog switch arranged to be controlled through galvanic separation with said digital control signal for connecting at least one dc voltage to the integrator stage.

13. The device as claimed in claim 12, wherein a direction control signal with a first and second mode is connected to the analog switch through galvanic separation, and the analog switch is arranged to connect to the integrator stage a first dc voltage in accordance with said digital control signal when the direction control signal is in the first mode, and to connect to the integrator stage a second dc voltage of opposite polarity in accordance with said digital control signal when the direction control signal is in the second mode.

14. The electric motor drive as claimed in claim 1, wherein said digital control signal is a control pulse.

15. The electric motor drive as claimed in claim 1, wherein the galvanic separation of the signal generator is implemented by an integrated DC-to-DC converter.

16. The electric motor drive as claimed in claim 1, in which said signal generator and said measuring and digitizing means are located on a separate circuit board that is mounted on a board connector on the main circuit board of the motor drive, and that said electric motor drive control processor or logic are located on the main circuit board.

17. The electric motor drive as claimed in claim 1, in which the power source of the analog parts of the signal generator and the measuring and digitizing means is galvanically separated from other operating voltages of the electric motor drive.

18. A device, especially a measuring or control signal transmitter, the device comprising:

a buffer stage, an analog switch, and an analog integrator configured to supply dc voltage to the analog integrator in accordance with a digital control signal, whereby the integrator is arranged to integrate said dc voltage and supply the integrated voltage through the buffer stage to an output of the device to form an analog current or voltage output signal in response to said digital control signal, an analog-to-digital converter configured to measure and digitize an actual current or voltage value of an analog output signal, and a control processor circuit or a control logic circuit configured to determine a difference between said digitized actual current or voltage value and a desired current or voltage value of the analog output signal and to control at least one of the analog integrator, the analog switch, and the analog switch with the digital control signal in such a manner that the difference decreases.

19. The device as claimed in claim 18, wherein said analog switch is configured to be controlled through galvanic separation with said digital control signal for connecting at least one dc voltage to the integrator stage.

20. The device as claimed in claim 18, wherein a direction control signal with a first and second mode is connected to the analog switch through galvanic separation, and the analog switch is arranged to connect to the integrator stage a first dc voltage in accordance with said digital control signal when the direction control signal is in the first mode, and to connect to the integrator stage a second dc voltage of opposite polarity in accordance with said digital control signal when the direction control signal is in the second mode.

* * * * *